United States Patent

Kozu et al.

[15] 3,686,851

[45] Aug. 29, 1972

[54] TALKING CLOCK APPARATUS

[72] Inventors: Isao Kozu; Yasutaka Nakashima, both of Osaka, Japan

[73] Assignee: Matsushita Electric Industrial Co., Ltd., Kadoma, Osaka, Japan

[22] Filed: March 4, 1970

[21] Appl. No.: 16,319

[30] Foreign Application Priority Data

March 10, 1969 Japan ..................44/19686
July 16, 1969 Japan ..................44/57803

[52] U.S. Cl.......................58/14, 274/4 H, 274/41.4
[51] Int. Cl. ........................................G04c 21/14
[58] Field of Search ..............58/14; 274/4, 42, 41.4; 74/112

[56] References Cited

UNITED STATES PATENTS 2,680,150 6/1954 Weld ......................274/42 X
3,074,724 1/1963 Fujimoto....................274/4 J
3,153,188 10/1964 McCarthy...............74/112 X

*Primary Examiner*—Richard B. Wilkinson
*Assistant Examiner*—Lawrence R. Franklin
*Attorney*—Wenderoth, Lind & Ponack

[57] ABSTRACT

An apparatus for vocally indicating the time of day, which includes a plurality of magnetic discs having a plurality of sound tracks for storing time voice signals corresponding to various points of time, a clock mechanism which rotates in accordance with the lapse of time, a stepping device for rotating the discs upon rotation of the clock mechanism, a magnetic head for reproducing the time voice signals stored on the discs, and a driving mechanism for moving the head substantially parallel with a plane of the discs so that the head scans each of the sound tracks to reproduce the time voice signal.

3 Claims, 15 Drawing Figures

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

INVENTORS
ISAO KOZU
YASUTAKA NAKAJIMA

BY Wenderoth, Lind & Ponack
ATTORNEYS

TALKING CLOCK APPARATUS

This invention relates to a clock apparatus, and more particularly to a talking clock apparatus for vocally indicating the time of day.

A usual clock indicates time by means of a dial and pointers, and thus cannot communicate the time of day when it is dark. Further, such a clock is substantially of no use to the blind. Although there is an apparatus of the type which vocally tells the time through the telephone service as provided by the telephone stations, such an apparatus would be very expensive if it were to be employed for private use.

It is therefore a general object of the present invention to provide a novel talking clock apparatus for vocally indicating the time of day at any desired time.

It is another object of the present invention to provide an improved talking clock apparatus which is simple to operate, inexpensive to manufacture and reliable in operation by using a plurality of magnetic discs formed with a plurality of sound tracks storing voice signals corresponding to various points of time.

It is still another object of the present invention to provide a compact talking clock apparatus for vocally broadcasting the time of day at any desired time by using a pair of magnetic discs upon which various time voice signals corresponding to hours and minutes, respectively are recorded.

It is still another object of the present invention to provide an improved talking clock apparatus having novel magnetic discs of a simple construction and which are relatively easy to manufacture and repair.

It is still another object of the present invention to provide an improved talking clock apparatus for vocally broadcasting the time of day repeatedly as long as an operator actuates a manual operating switch.

These objects are achieved in accordance with the present invention by the provision of a talking clock apparatus which comprises a plurality of discs each of which is provided with a magnetic layer having a plurality of sound tracks thereon for storing time voice signals corresponding to various points of time, a clock mechanism which rotates in accordance with the lapse of time, a stepping device for rotating said discs to shift said sound tracks upon rotation of said clock mechanism, a magnetic head for reproducing the time voice signals stored in said magnetic layers, and driving means for moving said magnetic head substantially parallel with a plane of said discs so that said magnetic head scans each of said sound tracks to reproduce the time voice signal.

The invention will become fully apparent from the following detailed description thereof taken in conjunction with the accompanying drawings, in which.

Figures 1, 2:
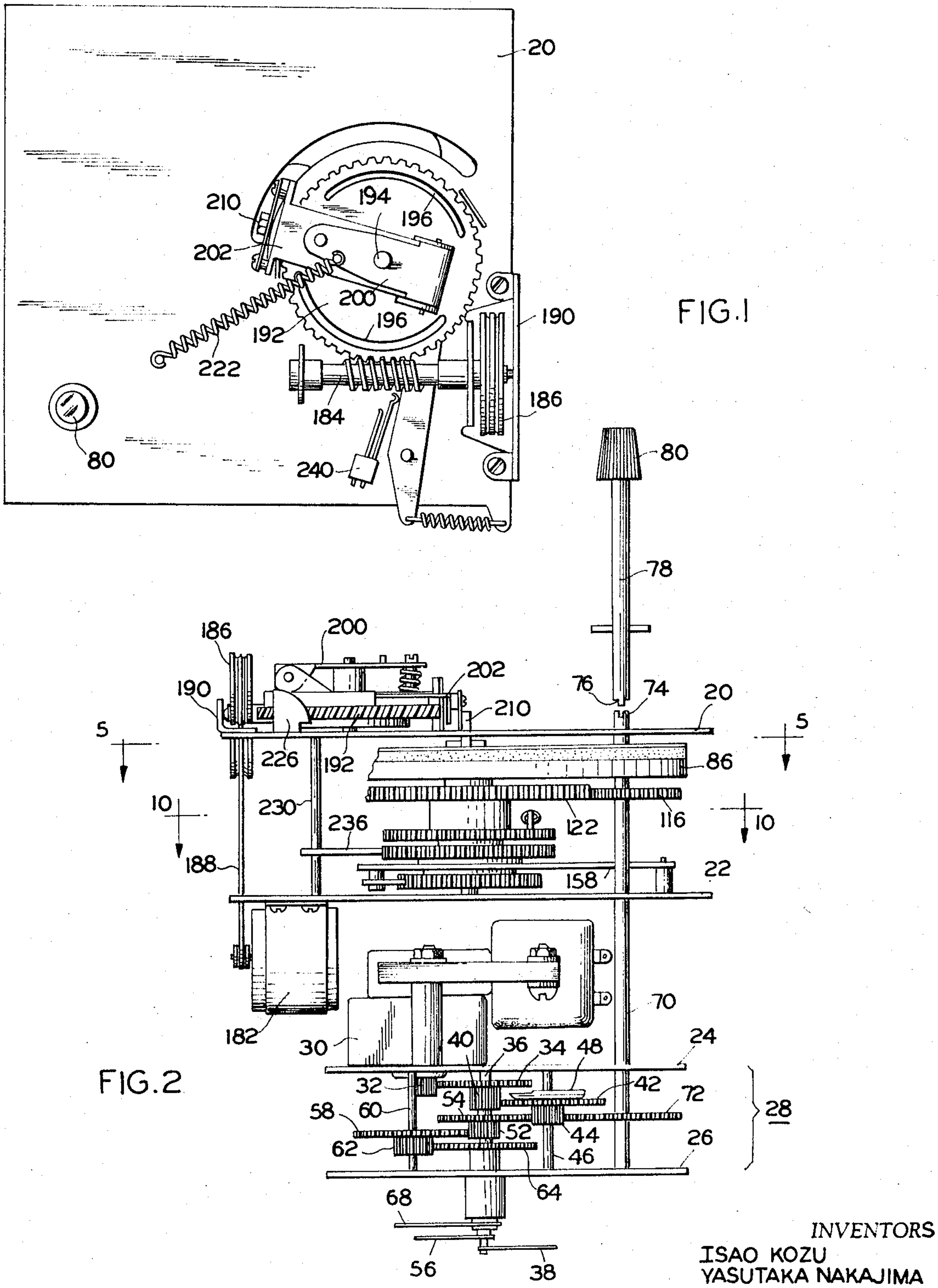
FIG. 1 is a top plan view of a talking clock apparatus according to the present invention.
FIG. 2 is a side view, partially in section, of the talking clock apparatus.

Referring to FIG. 1 and FIG. 2, there are provided horizontal plates 20, 22, 24, 26 connected in parallel with and spaced from each other by available stay poles (not shown). A clock mechanism 28 is mounted between the plates 24 and 26. A clock motor 30 is attached to the plate 24 and has a driving pinion 32 secured to an output shaft thereof. Said driving pinion 32 is meshed with a larger gear 34 secured to one end of a second hand shaft 36 which is journalled by the plates 24 and 26 in place therebetween, as shown particularly in FIG. 3. A second hand 38 is permanently affixed to a downwards extending end of the second hand shaft 36 and is adapted to achieve a full rotation for 1 minute according to the rotation of said clock motor 30. A pinion gear 40 integrally formed with said larger gear 34 is meshed with a larger gear 42 which is rotatably mounted on a boss portion of a pinion gear 44. Said pinion gear 44 is permanently secured to a shaft 46 which is rotatably journalled by the plates 24 and 26 in place therebetween. Said larger gear 42 is biased against the pinion gear 44 by a resilient friction disc 48 which is secured to the boss portion of said pinion gear 44. Accordingly, said pinion gear 44 is frictionally delivered rotation force from said larger gear 42.

Upon said second hand shaft 36, there is rotatably and coaxially mounted a tubular minute hand shaft 50 which forms integrally a pinion gear 52 and a larger gear 54 at upper end thereof. Said larger gear 54 is meshed with the pinion gear 44. A minute hand 56 is permanently affixed to the end of the minute hand shaft 50 opposite larger gear 54 and pinion gear 52 and is adapted to achieve a full rotation for 1 hour through the gears 40, 42, 44 and 54 in accordance with the rotation of the clock motor 30.

Figure 3:
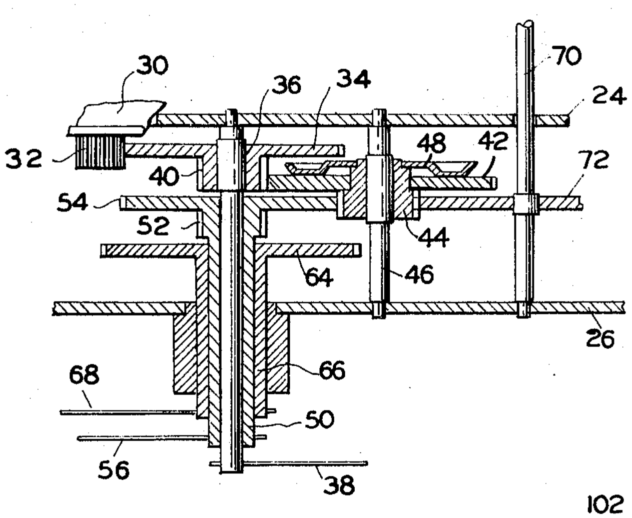
FIG. 3 is a fragmentary sectional view on an enlarged scale of a clock mechanism of the apparatus.

In FIG. 2, said pinion gear 52 is in meshing engagement with a counter gear 58 which is secured to a counter shaft 60 journalled by the plates 24 and 26 in place therebetween. A pinion gear 62 integrally formed with the counter gear 58 is meshed with a larger gear 64. In FIG. 3, said larger gear 64 has a tubular hour hand shaft 66 integrally formed therewith and rotatably and coaxially mounted on said minute hand shaft 50. An hour hand 68 is permanently affixed to the end of the hour hand shaft 66 opposite larger gear 64 and is adapted to achieve a full rotation for 12 hours through the gears 52, 58, 62 and 64 in accordance with the rotation of the clock motor 30.

A suitable numbered dial (not shown) is attached to a lower surface of the plate 26. The time of day is indicated by positions of the second hand 38, the minute hand 56 and the hour hand 68. As stated above, it is not always necessary to provide such hands and dial, because the clock apparatus of the present invention indicates vocally the time of day.

In this embodiment, the conventional electric clock motor is used as power source for the clock mechanism, but it can be replaced by a spiral spring.

Referring now to FIG. 2, an elongated shaft 70 extends through the plates 22, 24 and is journalled by the plates 20 and 26. A larger gear 72, permanently affixed to a lower portion of said shaft 70, is meshed with beforesaid pinion gear 44. At an upper end of the shaft 70, there is provided a recess 74 engageable with a protruding edge 76 of a regulating shaft 78 which is journalled by a supporting plate (not shown). The operator can regulate the indicating hands by a depressing and rotating operation of a knob 80 of the regulating shaft 78. Thus, the protruding edge 76 engages with the recess 74 so as to rotate the larger gear 72. In this case, a slip motion may occur between the pinion gear 44 and larger gear 42 so that the regulating torque of the regulating shaft 78 can be small and no excessive force can be delivered to the gears 40, 34, 32 and the clock motor 30.

Figure 4:
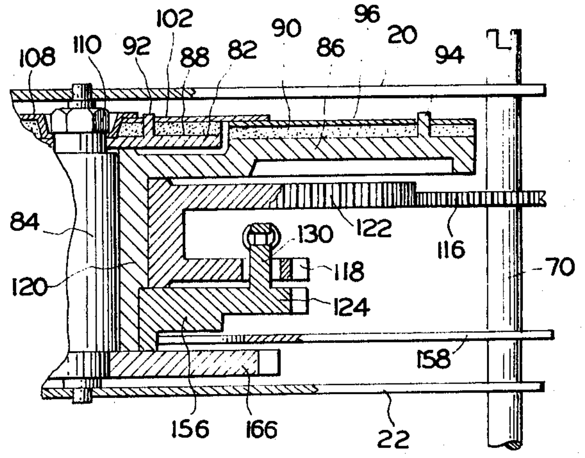
FIG. 4 is a fragmentary sectional view on an enlarged scale of magnetic discs rotating in accordance with the lapse of time.
Figure 5:
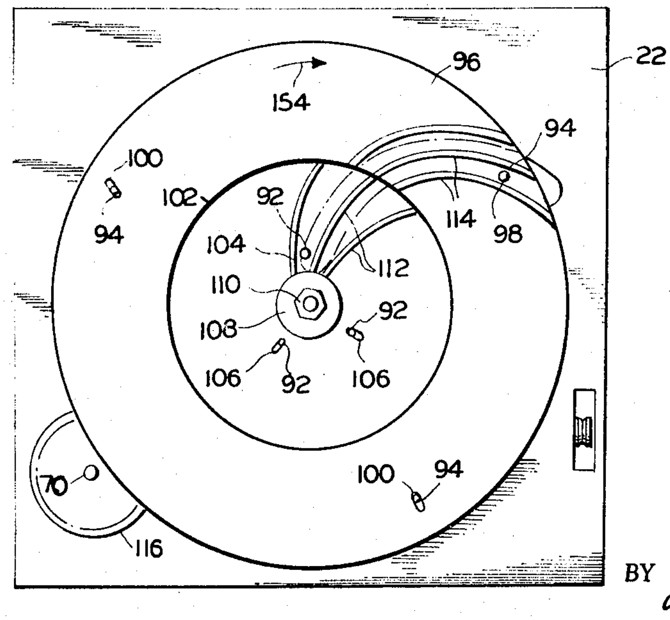
FIG. 5 is a sectional plan view of the apparatus taken along line 5—5 of FIG. 2.

Magnetic discs and stepping means for rotating said discs are mounted between the plates 20 and 22. Referring to FIG. 4, a small disc 82 is permanently affixed to an upper portion of a main shaft 84 which is rotatably journalled by the plates 20 and 22 in place therebetween. A larger disc 86 is coaxially mounted on said main shaft 84 so as to rotate independently upon said small disc 82. Said discs 82, 86 have cushion members 88, 90 adhered thereto and have locating pins 92, 94 secured to upper surfaces thereof respectively. In FIG. 4 and FIG. 5, a first magnetic flexible sheet 96 is attached to an upper surface of the cushion member 90 on the larger disc 86 and is indexed on said disc 86 by a fitting engagement of said locating pins 94 with a round hole 98 and two elongated holes 100 thereof. A second magnetic sheet 102 is attached to an upper surface of the cushion member 88 on the small disc 82 and is indexed on said disc 82 by a fitting engagement of said locating pins 92 with a round hole 104 and two elongated holes 106 thereof. An annular portion adjacent to a center opening of the second magnetic sheet 102 is restricted by a flange member 108 which is fastened to the main shaft 84 by a lock nut 110. This prevents the second magnetic sheet 102 from slipping.

The internal diameter of first magnetic sheet 96 is smaller than an external diameter of second magnetic sheet 102, and the external diameter of first magnetic sheet 96 is larger than the external diameter of second magnetic sheet 102. The second magnetic sheet 102 is positioned above the first magnetic sheet 96. Accordingly, upward movement of the first magnetic sheet 96 is limited by the external circular edge portion of the second magnetic sheet 102. This prevents first magnetic sheet 96 from slipping.

As shown in FIG. 5, second magnetic sheet 102 has thereon a magnetic layer, upon which 24 sound tracks 112 are formed. Each of the sound tracks 112 forms a circular arc from the center portion to the external circular edge portion of sheet 102, and stores pre-recorded time voice signals corresponding to the "-hours" of day respectively. According to the illustrated embodiment of the present invention, the time voice signals pre-recorded in the respective sound tracks 112 comprise a pair of 12 voice signals representing the points of time such as "one o'clock," "two o'clock," . . . and "twelve o'clock," as well as 24 voice signals representing the points of time such as "0 o'clock," "one o'clock," . . . and "twenty-three o'clock." The first magnetic sheet 96 has thereon a magnetic layer, upon which 60 sound tracks 114 are formed. Each of the sound tracks 114 forms a circular arc from the center portion to the external circular edge portion of said sheet 96, and stores pre-recorded time voice signals corresponding to the "minutes." According to the illustrated embodiment, the time voice signals pre-recorded in these respective sound tracks 114 comprise 60 voice signals representing the points of time such as "just," "one minute," "two minutes," . . . and "fifty-nine minutes."

The discs 82 86 are arranged in a manner that each one of the sound tracks 112, 114 forms a successive circular arc at the position corresponding the scanning locus of a magnetic head which will be described later.

There will be explained the constituents of a stepping device for rotating said discs 82 and 86 in more detail with reference to FIG. 4 and 10–14. The stepping device includes a Said stepping means includes first stepping means for intermittently rotating larger disc 86 at an interval of one pitch between every two adjacent sound tracks of the first magnetic sheet 96, and a second stepping means for intermittently rotating small disc 82 at an interval of one pitch between every two adjacent sound tracks of the second magnetic sheet 102.

In FIG. 4, the first stepping means is driven by a driving gear 116 secured to an upper portion of the shaft 70 which is rotated by the clock mechanism as described above. The second stepping means is driven by the first stepping means when the larger disc 86 achieves a full rotation thereof.

Figure 10:
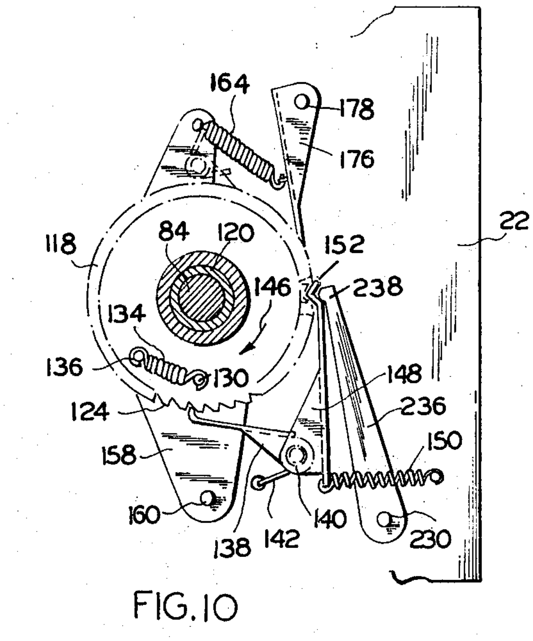
FIG. 10 is a sectional plan view of stepping means for rotating the magnetic discs taken along line 10—10 of FIG. 2.
Figure 11:
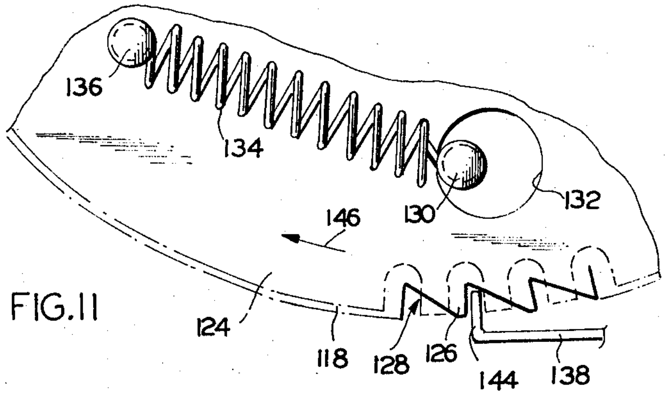

Referring to FIG. 4 and FIG. 10, the first stepping means comprises such members as will be described hereinafter. A claw wheel 118 is rotatably mounted on a boss portion 120 of the larger disc 86, and has a larger gear 122 integrally formed therefrom. Said larger gear 122 is meshed with driving gear 116 on the shaft 70, and is continuously rotated by a rotating force of the clock mechanism one full rotation per hour. A first ratchet wheel 124 is permanently secured to a lower portion of the boss portion 120 of larger disc 86 and is rotatable around the main shaft 84. Claw wheel 118 has 60 slope claws 126 formed at periphery thereof as shown in FIG. 11. First ratchet wheel 124 has 60 cutaway portions 128 formed at periphery thereof. The diameter of first ratchet wheel 124 is slightly smaller than that of claw wheel 118.

Referring to FIG. 4 and FIG. 11, first ratchet wheel 124 is provided with a pin 130 extended upward through a round hole 132 in the claw wheel 118. A tension spring 134 is disposed between pin 130 and a pin 136 secured on claw wheel 118. A regulating device 138 is pivotally mounted on a shaft 140 secured on the plate 22 as shown in FIG. 10 and FIG. 11. Device 138 is biased clockwise by a torsion spring 142. A turned edge portion 144 of the device 138 is pressed against one of the slope claw 126 of the claws wheel 118 and restricts temporarily the rotation of the first ratchet wheel 124 in the direction of arrow 146 by engaging with one of the cutaway portions 128 of ratchet wheel 124.

Figure 13:
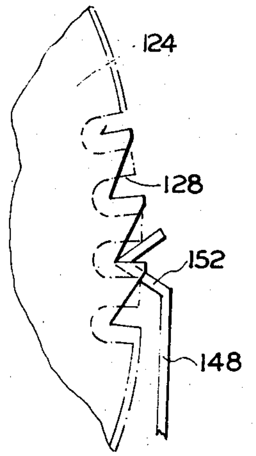
FIGS. 11, FIG. 12 and FIG. 13 are fragmentary sectional plan views of the stepping means of FIG. 7, taken along line 11—11 of FIG. 7, and illustrating the operation of the stepping means.

A first detent arm 148 is pivotally mounted on shaft 140 and is biased by a tension spring 150 so as to make detent action against the rotation of the first ratchet wheel 124 by a pressing engagement of a V-shaped edge portion 152 with one of the cutaway portions 128 of the first rotchet wheel 124 as shown in FIG. 13.

Figure 12:
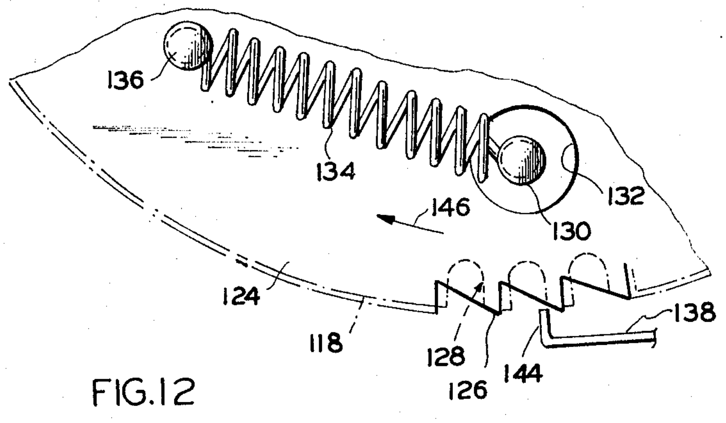

In the position shown in FIG. 11, the first ratchet wheel 124 can not rotate in the direction of the arrow 146 even when the claw wheel 118 is rotated in such direction by means of the clock mechanism, since the edge portion 144 of the regulating device 138 falls in the cutaway portion 128 of the first ratchet wheel 124. As claw wheel 118 is rotated, the spring 134 is tensioned gradually and the regulating device 138 is shifted out of portion 128 by the slope surface of the claw 126. Since the external diameter of the first ratchet wheel 124 is slightly smaller than that of the claw wheel 118 as stated above, the first ratchet wheel 124 is disengaged from the regulating device 138 when the claw wheel 118 rotates nearly one-sixtieth of full rotation thereof, which corresponds to about the pitch of one of claws 126 as shown in FIG. 12. This allows the first ratchet wheel 124 to rotate instantaneously in the direction of the arrow 146 under the biasing force of the spring 134 until the pin 130 strikes the left side surface of the hole 132 on the claw wheel 118. After the top portion of the claw 126 passes through from the regulating device 138, the turned edge portion 144 of the device 138 falls into the next cutaway portion 128 of the first ratchet wheel 124 so as to restrict successive rotation of the first ratchet wheel 124. Thus, the first ratchet wheel 124 continues the intermittent rotation according to the rotation of the clock motor 30. Upon such rotation of said first ratchet wheel 124, the larger disc 86 rotates intermittently an angle of 6° in every minute in the direction of an arrow 154 in FIG. 5.

The second stepping means comprises such members as will be described hereinafter with reference to FIG. 4, FIG. 10 and FIG. 14. Said first ratchet wheel 124 has a cam 156 integrally formed at the lower portion thereof. A ratchet lever 158 is swingably mounted on a shaft 160 secured on the plate 22 and is provided with a pin 162 secured to the middle portion thereof. Said pin 162 is pressed against the surface of the cam 156 under the biasing force of a tension spring 164 connected to an end of the lever 158. A second ratchet wheel 166 is permanently affixed to the lower end portion of the main shaft 84 to which the small disc 82 is secured as described above. Accordingly, said small disc 82 and said second ratchet wheel 166 can rotate together. The second ratchet wheel 166 has 24 ratchet claws 168 formed at the periphery thereof. A kicker plate 170 engageable with said ratchet claws 168 is pivotally mounted on a shaft 172 secured to said ratchet lever 158. Said kicker plate 170 is pressed against one of said ratchet claws 168 under the biasing force of a torsion spring 174.

A second detent arm 176 is pivotally mounted on a shaft 178 secured to the plate 22 and is biased by the tension spring 164 so as to make detent action against the rotation of the second ratchet wheel 166 by a pressing engagement of V-shaped edge portion 180 thereof with one of the ratchet claws 168 of the second ratchet wheel 166.

Figures 14, 15:
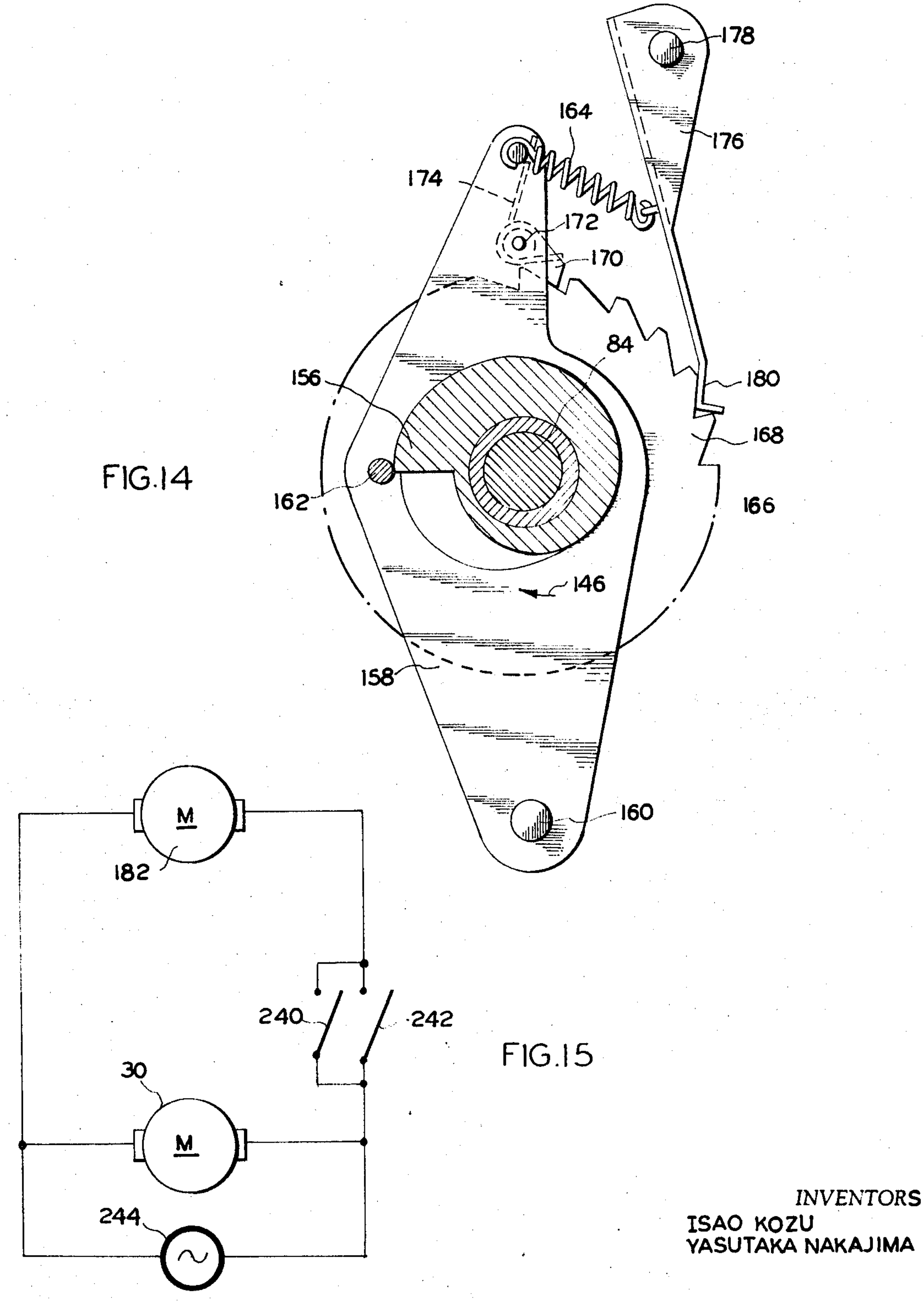
FIG. 14 is a fragmentary sectional view of a stepping means taken along line 14—14 of FIG. 7.
FIG. 15 is a diagrammatic illustration an electric control circuit for a clock motor and a head driving motor used in the apparatus.

In the position shown in FIG. 14, the pin 162 on the ratchet lever 158 is shifted up to the upper extremity of its stroke by the cam 156, and the larger disc 86 occupies such a position that a scanning locus of the magnetic head corresponds to the sound track upon which the time voice signal representing "fifty-nine minutes" is pre-recorded. When the first ratchet wheel 124 rotates instantaneously an angle of 6° in the direction of the arrow 146 from the above position, the ratchet lever 158 rotates clockwise about the shaft 160 by the force of the spring 164, because the pin 162 falls into a sharply cut-down portion of the profile of the cam 156. Upon this rotation of the ratchet lever 158, the kicker plate 170 drives one of the ratchet claws 168 to rotate the second ratchet wheel 166 instantaneously by an angle of 15°. Accordingly, in every full rotation of the first ratchet wheel 124, the small disc 82 also rotates an angle of 15° corresponding to one pitch of the sound tracks thereon, so that the next sound track corresponds to the scanning locus of the magnetic head. At the same time, the larger disc 86 also rotates an amount equal to one pitch of the sound tracks thereon and the sound track having the time voice signal, "just" pre-recorded thereon corresponds to the scanning locus of the magnetic head. After that, the pin 162 on the ratchet lever 158 is gradually shifted by the cam 156 up to the upper extremity in one hour, and rotating energy for the ratchet lever 158 is stored in the spring 164. In this condition, the kicker plate 170 is brought to the position at which said kicker plate 170 engages with the next ratchet claw 168.

The driving means for moving the magnetic head will be explained hereinafter with reference to FIG. 1, FIG. 2, FIG. 6–9.

Figure 6:
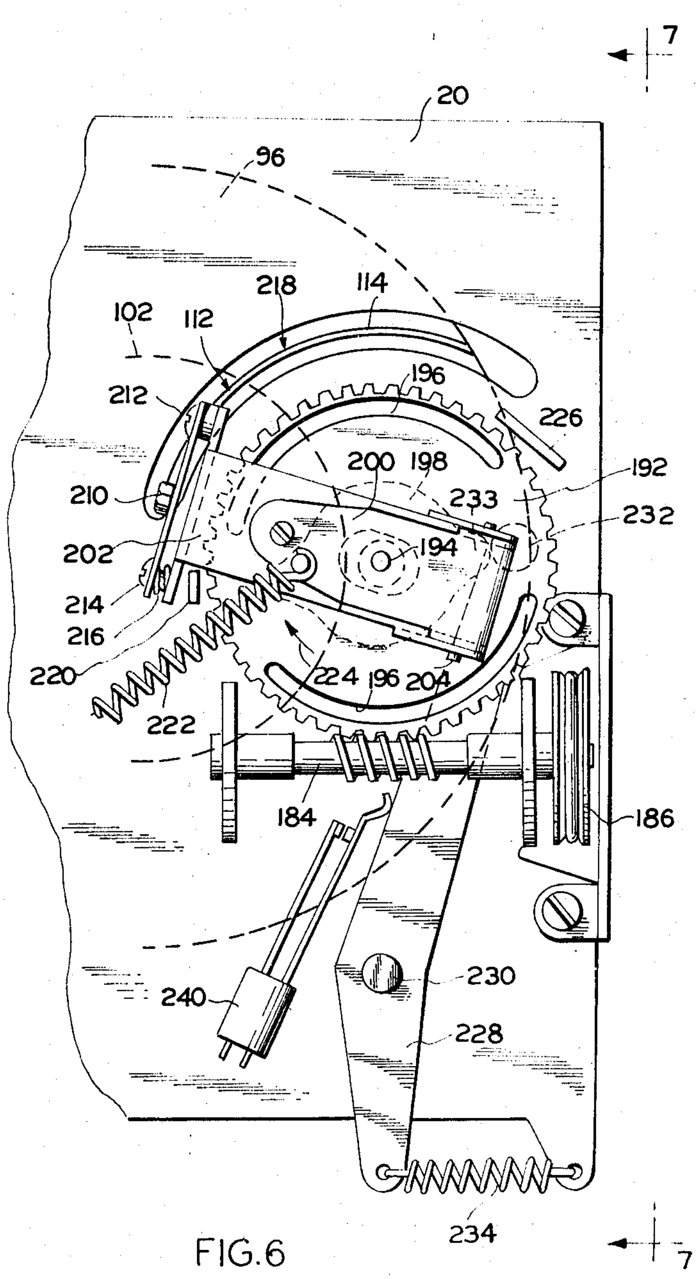
FIG. 6 is a fragmentary top plan view on an enlarged scale of the apparatus, showing a magnetic head in its original awaiting position.
Figure 7:
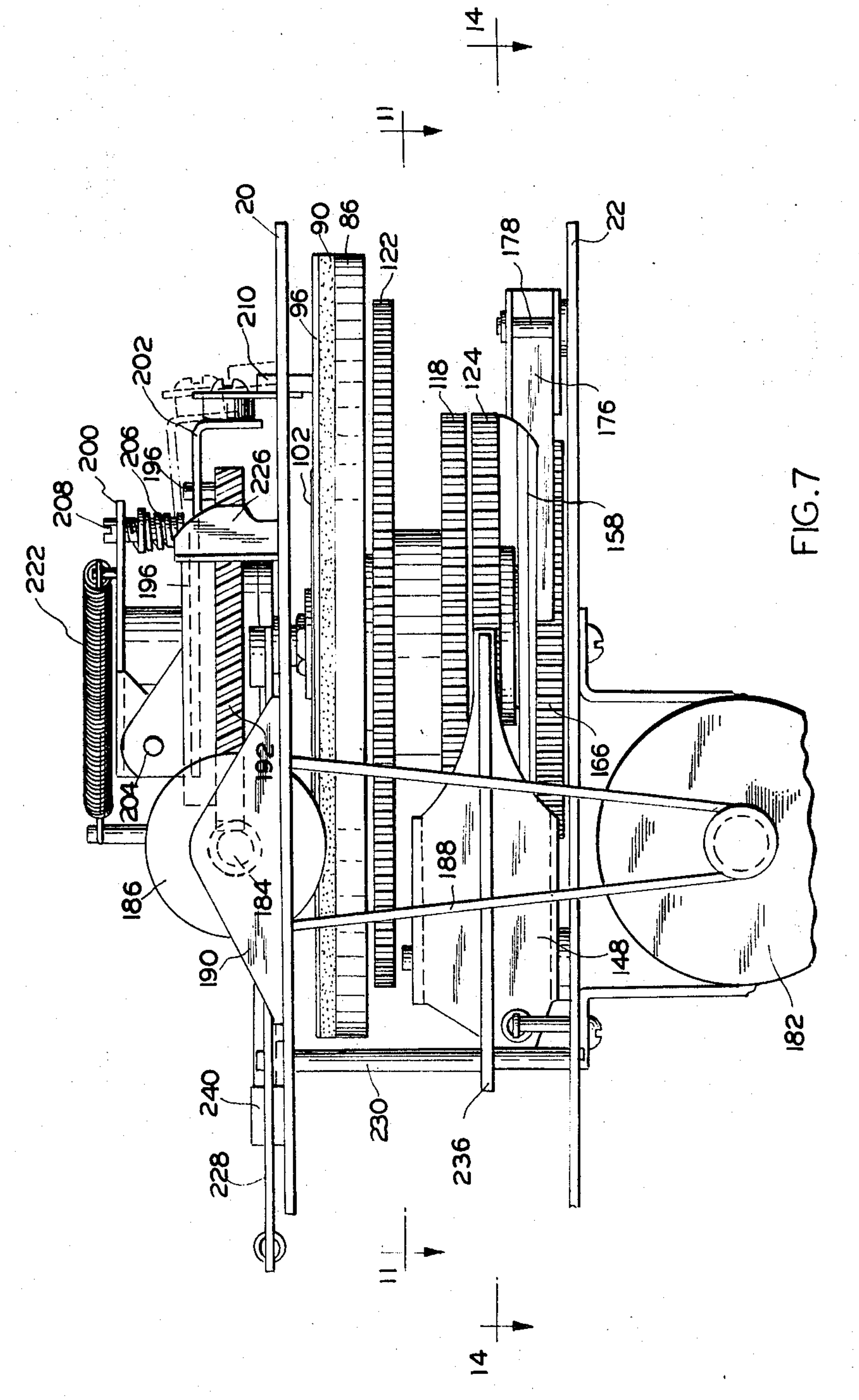
FIG. 7 is a fragmentary side view of the apparatus taken substantially along line 7—7 of FIG. 6.

A head driving motor 182 is mounted at the lower surface of the plate 22 as shown in FIG. 2 and FIG. 7. A worm pinion 184 is journalled on the plate 20 and has a V-shape pulley 186 secured to an end portion thereof. The V-shaped pulley 186 is driven by said motor 182 through an endless belt 188 as shown in FIG. 1 and FIG. 2. The thrust load of said worm pinion 184 is supported by a L-shaped plate 190 secured to the plate 20. Said worm pinion 184 is in meshing engagement with a worm wheel 192 which is rotatably mounted on a shaft 194 secured to the plate 20. Said worm wheel 192 has two driving elements 196 integrally formed at the upper surface thereof and a cam 198 integrally formed at the lower surface thereof as shown in FIG. 6. Said driving elements 196 form protruding circular arc portions respectively, which protrude above the upper surface of the worm wheel 192 by the same amount. In FIG. 6 and FIG. 7, a first head arm 200 is rotatably mounted on the shaft 194 coaxially with the worm wheel 192. A second head arm 202 is rotatably supported by a horizontal shaft 204 which is mounted at an end of said first head arm 200. A compression spring 206 is disposed between the first head arm 200 and the second head arm 202. The depressing force of said spring 206 against said second head arm 202 is adjustable by regulation of an adjustable screw 208 mounted at the other end of the first head arm 200.

A magnetic head 210 is attached to a free end of the second head arm 202 by means of a set screw 212 and an adjustable screw 214 through a compression spring 216. Azimuth of head 210 can be regulated by adjustment of the adjustable screw 214. Head 210 extends downwardly through a circular arc opening 218 in the plate 20 and is adapted to contact magnetic sheets 96 and 102. The second head arm 202 is pressed against a stopper lug 220 on the plate 20 by a tension spring 222 which is connected to the first head arm 200. When the head driving motor 182 is not energized, the head 210 is kept apart from the magnetic sheet 102, since the second head arm 202 is seated on the upper surface of the driving element 196 as shown in dot-dash lines of FIG. 7.

Figures 8, 9:
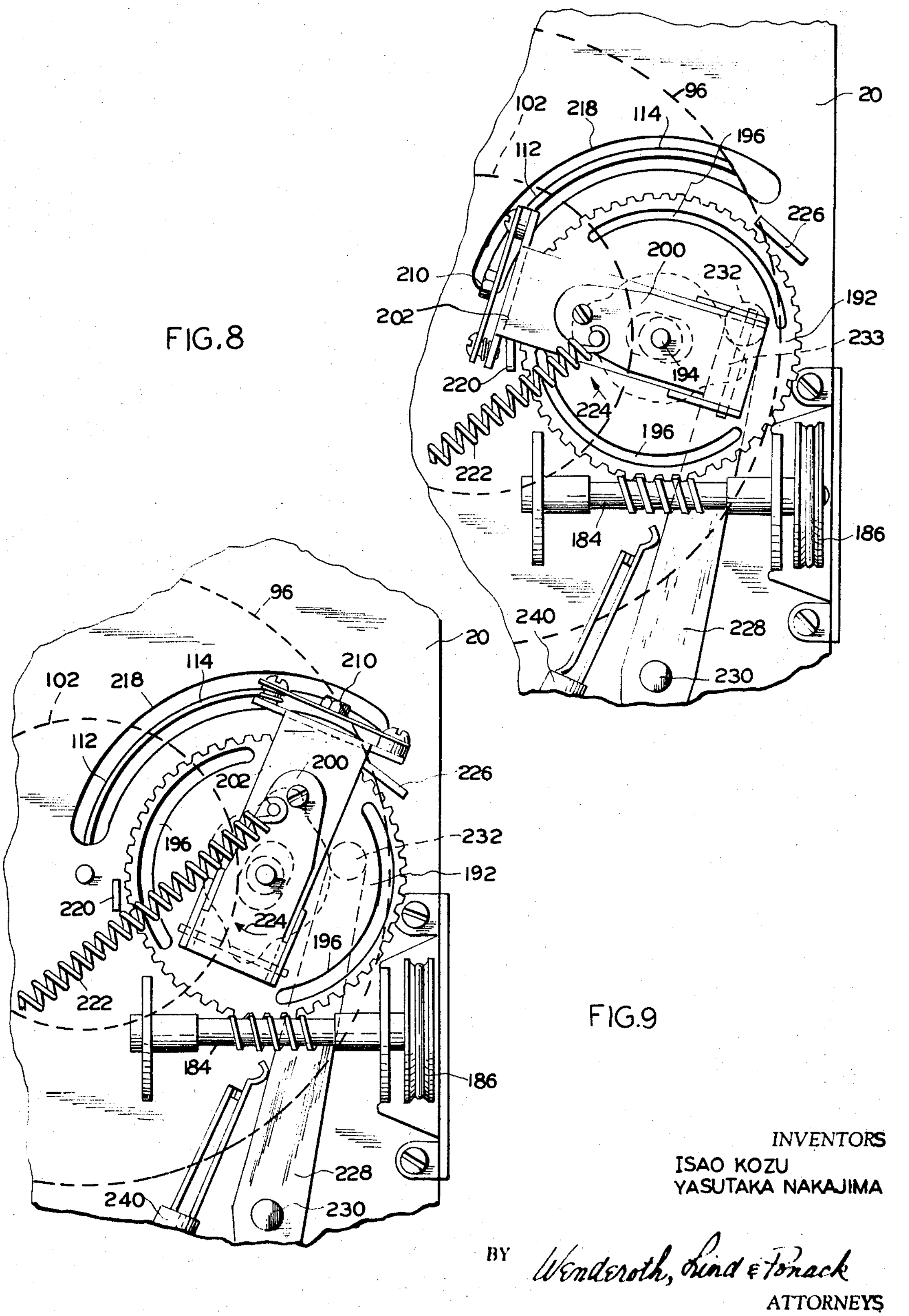
FIGS. 8 and FIG. 9 are fragmentary top plan views similar to FIG. 6, but with the magnetic head in various operating positions.

When the worm wheel 192 rotates in the direction of arrow 224 from the position shown in FIG. 6 to the position shown in FIG. 8, the second head arm 202 falls into the chasmed portion between the pair of driving elements 196 under the biasing force of the compression spring 206. Thus, the magnetic head 210 moves downwards to the position illustrated in solid line in FIG. 7 and contacts the second magnetic sheet 102. When the worm wheel 192 continues its rotation from the position shown in FIG. 8, the second head arm 202 is driven by the side wall of the driving element 196 in the direction of the arrow 224 so that the head 210 scans one of the sound tracks on the second magnetic sheet 102 and successively one of the sound tracks on the first magnetic sheet 96. Each of the magnetic sheets 102 and 96 is arranged in such manner that time voice signals stored on sound tracks 112 and 114 correspond to the time indicated by the time indicating hands of the clock mechanism. Accordingly, the voice signals representing the time of day are reproduced by the magnetic head 210 upon a swinging motion of the second head arm 202.

When the head 210 reaches the position near the external circular edge portion of the first magnetic sheet 96 as shown in FIG. 9, the second head arm 202 begins to engage with a return member 226 formed on the plate 20. Return member 226 has a sloped portion gradually ascending in the direction of movement of said second head arm 202 as shown in FIG. 7. The second head arm 202 is shifted upwards by return member (226) as the second head arm rotates, and the magnetic head 210 moves away from the first magnetic sheet 96. When the return member 226 shifts the second head arm 202 up to a position higher than the driving element 196 so as to disengage the second head arm 202 from the driving element 196, the head arms 202 and 200 are returned instantaneously to their original awaiting position by the spring 222 as shown in FIG. 6.

If the magnetic discs rotate while the magnetic head is scanning the sound tracks as mentioned above, the reproduction of the time voice signals can not be perfectly achieved. Accordingly, the talking clock apparatus of the present invention has brake means for making brake action against the magnetic disc while the magnetic head is scanning the sound tracks of said discs.

With reference to FIG. 6 and FIG. 7, a first brake lever 228 is secured to an upper end of a shaft 230 which is rotatably journalled by the plates 20 and 22. First brake lever 228 is provided with a rotatable roller 232 at one end thereof, which is engageable with the cam 198 formed at the lower surface of the worm wheel 192. Cam 198 has two projected portions 233 corresponding to the two chasmed portions between the driving elements 196, respectively. Roller 232 is pressed against one of the projected portions 233 of cam 198 under the biasing force of a tension spring 234 connected to the other end of the first brake lever 228. A second brake lever 236 is permanently affixed to a middle portion of the shaft 230 and is rotatable together with first brake lever 228. Second brake lever 236 has a projection 238 formed at an end thereof, which is engageable with the V-shaped edge portion 152 of the first detent arm 148 as shown in FIG. 10. When the worm wheel 192 is in a stopped position, roller 232 is shifted by the projected portion 233 of the cam 198 so that the first brake lever 228 is moved to the clockwise extremity of its stroke as shown in FIG. 6, and the projection 238 of the second brake lever 236 is spaced from the first detent lever 148 as shown in FIG. 10. Accordingly, the magnetic discs can rotate according to the lapse of time as stated above.

However, the roller 232 may follow the profile of the cam 198 and the first brake lever 228 swings counterclockwise about the shaft 230 when the worm wheel 192 starts to rotate in the direction of the arrow 224 so as to swing the second head arm 202 as shown in FIG. 8. At the same time, the second brake lever 236 in FIG. 10 also rotates counterclockwise to press the projection 238 against the V-shaped edge portion 152 of the first detent arm 148. As a result of this operation, the first ratchet wheel 124 will not rotate even when said wheel 124 is unlatched from the regulating device 138. Since the rotation of the second ratchet wheel 166 is initiated by the rotation of the first ratched wheel 124 as described above, the second ratchet wheel 166 will also not rotate. On the other hand, the claw wheel 118 can continue its rotation under the driving force of the clock mechanism, because the diameter of the hole 132 on the claw wheel 118 is sufficiently larger than that of the pin 130 on the first ratchet wheel 124. This allows the claw wheel 118 to rotate at least more than one pitch of the claws 126. When the scanning of the magnetic head is finished and the first brake lever 228 is shifted clockwise by the other projected portion 233 of the cam 198, the pressing engagement of the second brake lever 236 with the first detent lever 148 is released. At the same time, the first ratchet wheel 124 immediately follows the claw wheel 118 under the biasing force of the spring 134. This means that the time indicated vocally by this apparatus will not be out of order because of the braking action of the brake means.

Referring to FIG. 6, first normally open switch 240 engageable with the first brake lever 228 is mounted on plate 20. Switch 240 is open when the second head arm 202 is in its original awaiting position and the first brake lever 228 is shifted by the cam 198 to its clockwise extremity as shown in FIG. 6. Switch 240 is closed when actuated by the first brake lever 228 according to the counterclockwise rotation of lever 228 as the result of the rotation of the cam 198 as shown in FIG. 8. With reference to FIG. 15, a second normally open switch 242 is connected in parallel with first switch 240. Said second switch 242 can be actuated by the operator. The clock motor 30 is directly connected to a electric power supply 244 and the head driving motor 182 is connected to power supply 244 through switches 240 and 242. Accordingly, the clock motor 30 always rotates in order to drive the clock mechanism. As a result, the indicating hands indicate the time of day and the magnetic discs are intermittently rotated according to the lapse of time. Thus, the voice signals on the sound tracks at the locus of the movement of the magnetic head always correspond to the time indicated by the indicating hands of the clock mechanism as time elapses.

When the second switch 242 is actuated by the operator at a desired point of time, electric power 244 is supplied to the head driving motor 182 so that the worm wheel 192 starts to rotate through the belt 188, the pulley 186 and the worm pinion 184. Thus, the driving element 196 on worm wheel 192 drives the second head arm 202 to initiate the scanning operation of the magnetic head 210. At first, the head 210 scans one of the tracks 112 on the small disc 82 to reproduce a time voice signal representing the "hour," and further scans one of the tracks 114 on the larger disc 86 to reproduce a time voice signal representing the "-minute." These reproduced outputs are amplified by a suitable amplifier circuit and are broadcasted by a suitable loud speaker. Since the details of such amplifier and loud speaker are well known in the art, it will be unnecessary to describe them herein.

Even if the operator stops his operation by closing second switch 242 during the scanning operation of the magnetic head 210, the head driving motor 182 continues its rotation, because the first switch 240 is switched to its closed position by the counterclockwise swinging motion of the first brake lever 228. After termination of scanning operation of the head 210, the second head arm 202 engages the returning member 226 and returns to its original awaiting position. After this returning motion of the second head arm 202, the first brake lever 228 is shifted by the cam 198 so as to disengage from the first switch 240. As a result, the first switch 240 is opened, and the head driving motor 182 stops its rotation.

When the operator keeps the second switch 242 in its closed position for a long time, the power supply to the motor 182 is not cut off for the length such time, whereby the worm wheel 192 continues its rotation and enables the magnetic head 210 to repeat its scanning operation until the second switch 242 is released by the operator. In this way the operator can hear the reproduced time voice signal as often as he desires.

If the times indicated by the indicating hands of the clock mechanism and by the reproduced voice signal accidentally become out of phase, the operator can regulate the time by depressing and turning the knob 80 in FIG. 2.

In the embodiments described above, the larger disc 86 has 60 tracks formed thereon. However the number of the tracks of the larger disc may be 30 corresponding to the voice signals representing "just," "two minutes," "four minutes," . . . and "fifty-eight minutes." In this case, the large disc 86 will intermittently rotate an angle of 12° every 2 minutes. Thus, the number of the tracks on the magnetic discs can be altered at the option of a designer.

It will be apparent to those skilled in the art that various modifications may be made without departing from the spirit of the invention. The above described specific examples are intended merely to illustrate various facets in certain selective embodiments of the invention.

What is claimed is:

1. In a talking clock apparatus, the combination comprising:

a first disc having a first annular magnetic flexible sheet attached to an upper surface thereof, said first annular magnetic flexible sheet having a plurality of sound tracks thereon for storing time voice signals corresponding to minutes of time;

a second disc coaxially aligned with said first disc and having a second magnetic flexible sheet attached to an upper surface thereof, said second magnetic flexible sheet having an external diameter smaller than the external diameter of the first magnetic sheet and having a plurality of sound tracks thereon for storing time voice signals corresponding to hours of time;

a clock mechanism which rotates in accordance with the lapse of time;

a stepping device coupled between said clock mechanism and said discs for rotating said discs to shift said sound tracks upon rotation of said clock mechanism;

a magnetic head for reproducing said time voice signals stored in said first and second magnetic sheets;

a swingable head arm having a free end on which said magnetic head is mounted, said head arm being swingable between a waiting position and an end of scanning position, a first spring coupled to said head arm for pressing said magnetic head onto said magnetic sheets and a second spring coupled to said head arm for biasing said head arm toward the waiting position; and driving means which include a head driving motor, a worm gear driven by said motor, a worm wheel meshing with said worm gear, a protruding circular arc-shaped driving element formed on an upper surface of said worm wheel, said driving element having a side surface engageable with said head arm for driving said head arm in swinging movement from the waiting position to the end of the scanning position and having an upper surface engagable under said head arm for keeping said magnetic head spaced from said magnetic sheets at the waiting position, and during movement of said head arm toward said waiting position, and a return member at the end of scanning position engageable by said swing arm for disengaging said magnetic head from said first magnetic sheet and said head arm from said side surface, whereby upon energization of said motor, said driving element moves out from under said head arm and said head arm falls from said driving element under the biasing force of said first spring and said magnetic head is pressed onto said second magnetic sheet, said head arm is driven by a side surface of said driving element to swing said magnetic head to scan one of the sound tracks on said second magnetic sheet and successively one of the sound tracks on said first magnetic sheet to reproduce the time voice signal, and said return member disengages said magnetic head from said first magnetic sheet and disengages said head arm from the side surface of the driving element after the termination of the scanning of the first magnetic sheet by said magnetic head, and said head arm is returned to its waiting position by the biasing force of said second spring being moved along the upper surface of said driving element so as to keep said magnetic head spaced from said magnetic sheets during the movement of said head arm toward the waiting position.

2. The combination as claimed in claim 1 wherein the external diameter of said second magnetic flexible sheet is larger than the internal diameter of said first annular magnetic flexible sheet, and fastening means on said second disc engaging the annular portion of said second sheet adjacent to the center opening of said second magnetic sheet, whereby movement of said first magnetic sheet in a direction perpendicular to the plane of said sheet is limited by the external circular edge portion of said second magnetic sheet.

3. The combination as claimed in claim 1 further comprising:

brake means which includes a brake lever coupled to said first disc for braking said first disc against the rotation force of said stepping device during the scanning of said magnetic sheets by said magnetic head, and a cam combined with said worm wheel and coupled to said brake lever for driving the same under the rotation force of said worm wheel to release said first disc from restriction against the rotation by said brake lever while said magnetic head remains at the waiting position.

* * * * *